US011885276B2

(12) United States Patent
Lehtinen

(10) Patent No.: US 11,885,276 B2
(45) Date of Patent: Jan. 30, 2024

(54) HEATING VALUE ESTIMATION

(71) Applicant: WÄRTSILÄ FINLAND OY, Vaasa (FI)

(72) Inventor: Kimmo Lehtinen, Vaasa (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 101 days.

(21) Appl. No.: 17/604,675

(22) PCT Filed: Apr. 16, 2019

(86) PCT No.: PCT/FI2019/050305
§ 371 (c)(1),
(2) Date: Oct. 18, 2021

(87) PCT Pub. No.: WO2020/212641
PCT Pub. Date: Oct. 22, 2020

(65) Prior Publication Data

US 2022/0205406 A1 Jun. 30, 2022

(51) Int. Cl.
*F02D 41/24* (2006.01)
*F02D 41/00* (2006.01)

(52) U.S. Cl.
CPC ..... *F02D 41/2422* (2013.01); *F02D 41/0025* (2013.01); *F02D 2200/0606* (2013.01);
(Continued)

(58) Field of Classification Search
CPC ......... F02D 41/0025; F02D 2200/0606; F02D 2200/0612; F02D 2200/0625
See application file for complete search history.

(56) References Cited

U.S. PATENT DOCUMENTS 6,612,186 B1 9/2003 Patten et al.
9,845,761 B2 12/2017 Hoshi et al.
(Continued)

FOREIGN PATENT DOCUMENTS

CN 104903563 A 9/2015
DE 102016110517 A1 12/2016
(Continued)

OTHER PUBLICATIONS

International Preliminary Report on Patentability (PCT/IPEA/409) dated Dec. 4, 2020, by the European Patent Office as the International Examining Authority for International Application No. PCT/FI2019/050305. (20 pages).
(Continued)

*Primary Examiner* — Kevin A Lathers
(74) *Attorney, Agent, or Firm* — BUCHANAN INGERSOLL & ROONEY PC

(57) ABSTRACT

Exemplary embodiments include a method for analysis of fuel supplied to a combustion engine during operation of the engine. The method can include obtaining respective indications of a temperature of the fuel supplied to the engine and a density of the fuel supplied to the engine; deriving a temperature-adjusted fuel density based on the indicated density of fuel in dependence of relationship between the indicated temperature of the fuel and a predefined reference temperature; and deriving, based at least on the temperature-adjusted fuel density, a heating value that is descriptive of the amount of heat released during combustion of a predefined amount of the fuel.

25 Claims, 2 Drawing Sheets

(52) U.S. Cl.
CPC ................ *F02D 2200/0612* (2013.01); *F02D 2200/0625* (2013.01)

(56) References Cited

U.S. PATENT DOCUMENTS

| | | | | |
|---|---|---|---|---|
| 9,938,905 | B2 | 4/2018 | Davies et al. | |
| 2008/0040014 | A1 * | 2/2008 | Yahata .................... | F01N 9/002<br>701/99 |
| 2012/0078567 | A1 | 3/2012 | Ewens et al. | |
| 2015/0315978 | A1 | 11/2015 | Davies et al. | |
| 2016/0258379 | A1 | 9/2016 | Rasmussen et al. | |
| 2016/0363084 | A1 | 12/2016 | Hoshi et al. | |
| 2017/0248094 | A1 | 8/2017 | Zimmer et al. | |

FOREIGN PATENT DOCUMENTS

| | | | |
|---|---|---|---|
| EP | 2415996 | A1 | 2/2012 |
| GB | 651423 | A | 4/1951 |
| WO | 0161285 | A1 | 8/2001 |
| WO | 2005062194 | A1 | 7/2005 |
| WO | 2010120245 | A1 | 10/2010 |
| WO | 2016043744 | A1 | 3/2016 |

OTHER PUBLICATIONS

International Search Report (PCT/ISA/210) with translation and Written Opinion (PCT/ISA/237) dated Dec. 6, 2019, by the European Patent Office as the International Searching Authority for International Application No. PCT/FI2019/050305. (13 pages).

* cited by examiner

HEATING VALUE ESTIMATION

TECHNICAL FIELD

The present invention relates to estimation of a heating value of fuel supplied to an engine.

BACKGROUND

The amount of energy obtained from certain fuel may be described using a heating value that is descriptive of the amount of heat released during combustion of a specified amount of the certain fuel. In other words, the heating value serves as indication of the energy content of the certain fuel. Consequently, when applied to fuel supplied to a given combustion engine, the heating value is descriptive of the mechanical energy obtainable from the certain fuel by operation of the given combustion engine. Since the quality of the fuel in terms of mechanical energy obtainable therefrom varies, the heating value of a certain fuel serves as a measure that enables, on one hand, deriving an indication of fuel consumption by the given combustion engine and, on the other hand, deriving an indication of actual efficiency of the given combustion engine.

Therefore, from an engine operator point of view, reliable estimation of the heating value of a fuel actually supplied to a combustion engine gives valuable information on the quality of the fuel in terms of the mechanical energy obtainable therefrom via operation of the combustion in the engine, while at the same time the heating value also enables monitoring and/or estimation of various aspects of engine operation, for example the efficiency of the combustion engine, the fuel consumption of the combustion engine and emission resulting from combustion of the fuel by the combustion engine.

In context of combustion engines that rely on combustion of residual fuels such as medium fuel oil (MFO) or heavy fuel oil (HFO), an interesting measure of the energy content is a lower heating value (LHV), which may be expressed as the energy content per mass unit (e.g. as megajoules per kilogram) and which may be computed, for example, as a net specific energy according to the point E.2 of ISO 8217:2012 Annex E. For distillate fuels, the LHV may be computed as a net specific energy according to the point E.3 of ISO 8217:2012 Annex E. While the LHV or a corresponding measure of fuel quality serves as one useful indication of the quality of a residual fuel, currently known methods for deriving such a quality measure require analysis of a fuel sample in a laboratory environment, which does not only make online monitoring of the fuel quality and the engine efficiency impossible but also renders monitoring of these fuel-related aspects both expensive and time consuming process.

SUMMARY

In view of the foregoing, it is an object of the present invention to provide a technique that enables swift and reliable calculation or estimation of the heating value of a residual fuel to facilitate online estimation of fuel quality, engine efficiency, fuel consumption and/or emissions resulting from combustion of the fuel.

The object(s) of the invention are reached by an arrangement, by a method and by a computer program as defined by the respective independent claims.

According to an example embodiment, an apparatus for analysis of fuel supplied to a combustion engine during operation of the engine is provided, the apparatus comprising a fuel flow measurement assembly for measuring respective indications of a temperature of the fuel supplied to said engine and a density of the fuel supplied to said engine; and a control entity for deriving one or more parameters that are descriptive of observed fuel quality based at least on said temperature of the fuel and said density of the fuel, the control entity arranged to derive a temperature-adjusted fuel density based on the indicated density of fuel in dependence of relationship between the indicated temperature of the fuel and a predefined reference temperature, and derive, based at least on the temperature-adjusted fuel density, a heating value that is descriptive of the amount of heat released during combustion of a predefined amount of said fuel.

According to another example embodiment, a method for analysis of fuel supplied to a combustion engine during operation of the engine is provided, the method comprising obtaining respective indications of a temperature of the fuel supplied to said engine and a density of the fuel supplied to said engine; deriving a temperature-adjusted fuel density based on the indicated density of fuel in dependence of relationship between the indicated temperature of the fuel and a predefined reference temperature; and deriving, based at least on the temperature-adjusted fuel density, a heating value that is descriptive of the amount of heat released during combustion of a predefined amount of said fuel.

According to another example embodiment, a computer program is provided, the computer program comprising computer readable program code configured to cause performing at least a method according to the example embodiment described in the foregoing when said program code is executed on one or more computing apparatuses.

The computer program according to an example embodiment may be embodied on a volatile or a non-volatile computer-readable record medium, for example as a computer program product comprising at least one computer readable nontransitory medium having program code stored thereon, the program which when executed by one or more apparatuses cause the one or more apparatuses perform at least to perform a method according to the example embodiment described in the foregoing.

The exemplifying embodiments of the invention presented in this patent application are not to be interpreted to pose limitations to the applicability of the appended claims. The verb "to comprise" and its derivatives are used in this patent application as an open limitation that does not exclude the existence of also unrecited features. The features described hereinafter are mutually freely combinable unless explicitly stated otherwise.

Some features of the invention are set forth in the appended claims. Aspects of the invention, however, both as to its construction and its method of operation, together with additional objects and advantages thereof, will be best understood from the following description of some example embodiments when read in connection with the accompanying drawings.

BRIEF DESCRIPTION OF FIGURES

The embodiments of the invention are illustrated by way of example, and not by way of limitation, in the figures of the accompanying drawings, where FIG. 1 schematically illustrates a framework for online analysis of fuel quality according to an example.

DESCRIPTION OF SOME EMBODIMENTS

Figure 1:
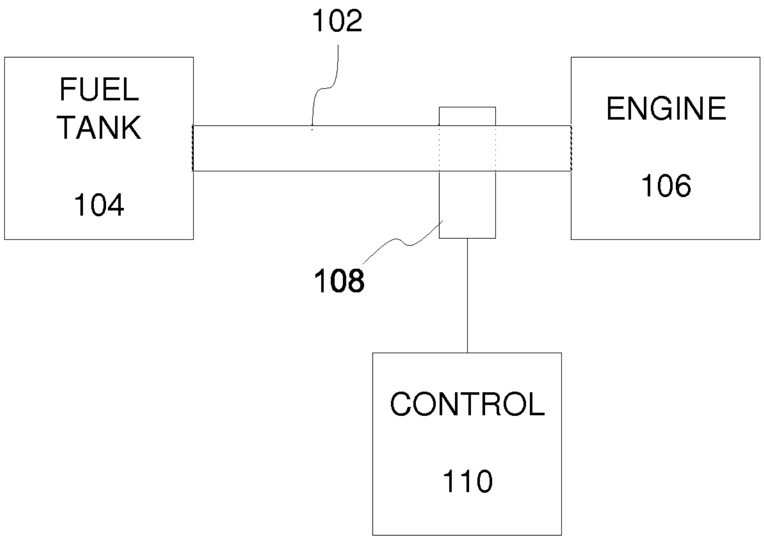
Figure 3:
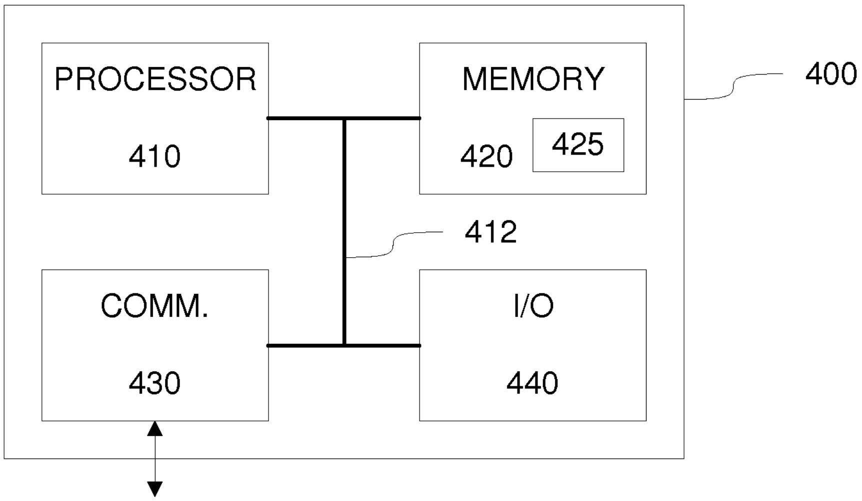
FIG. 3 illustrates a block diagram of some elements of an apparatus according to an example.

Combustion engines, such as internal combustion engines (ICEs), may be applied in demanding industrial environments such as power plants, in marine vessels, oil rigs and other offshore platforms, etc. where a single engine or an engine system of a plurality of (e.g. two or more) engines may be applied as the supply of mechanical energy for propulsion in a marine vessel or as input to a generator for provision of electrical power. Typically, in such usage scenarios the engine(s) are continuously operated for prolonged periods of time and operation at a high efficiency is important in terms of keeping the fuel consumption and emissions as low as possible. A combustion engine may be able to combust distillate fuel, residual fuel or any of these two. One of the difference between these two fuel types is their viscosity: distillate fuels have a lower viscosity and hence they can be supplied (e.g. pumped) for combustion in an engine at relatively low temperatures, whereas residual fuels have a higher viscosity and typically heating of the residual fuel is needed to provide viscosity that makes it possible to pump the residual fuel for combustion in an engine. Examples of residual fuel types applicable in ICEs of the type outlined in the foregoing include medium fuel oil (MFO) or heavy fuel oil (HFO). An advantage of a residual fuel such as HFO is its low cost, while on the other hand due to high viscosity of residual fuels they need be heated to a temperature in a range around 100 degrees Celsius before use to ensure viscosity level that enables pumping the residual fuel to the engine. Another disadvantage of residual fuels is that they typically also include some impurities such as water, ash and/or sulphur that may reduce the energy value of the fuel to some extent.

The present disclosure describes a technique that enables online analysis for evaluation of the heating value of fuel supplied to one or more engines. Such monitoring of the fuel quality provides valuable information that may enable, for example, adjustment of the engine operation to account for the observed fuel quality to extent possible in an attempt to optimize the engine operating efficiency, fuel consumption and/or resulting emissions. Monitoring of the fuel quality also provides further input for estimating or computing the actual efficiency of the engine, which may be incorrectly estimated if not taking into account possible variations in the fuel quality. Continuous monitoring of engine efficiency, in turn, provides valuable additional information on the condition of the engine over longer periods of time periods, since inefficient operation (due to poor fuel quality) quite obviously requires combustion of a higher amount of fuel to get the certain output power from the engine, which in turn results in increased wear and tear of the engine in comparison to engine operation using a higher quality fuel. Moreover, such monitoring of fuel quality further enables provision of fact-based feedback to the fuel supplier regarding the actual observed fuel quality.

FIG. 1 schematically illustrates a framework for online analysis of fuel quality according to an example, the framework including a fuel supply line 102 from a fuel tank 104 to an engine 106. The engine 106 may comprise, for example, a combustion engine, such as an internal combustion engine. Moreover, a fuel flow measurement assembly 108 is arranged in the fuel supply line between the fuel tank 104 and the engine 106. The fuel flow measurement assembly is communicatively coupled to a control entity 110 and it is arranged to provide one or more measurement signals that are descriptive of the fuel flow characteristics in the fuel supply line 102 to the control entity 110, which is arranged to derive one or more parameters that are descriptive of the observed fuel quality based on the fuel flow characteristics indicated in the one or more measurement signals. The one or more parameters descriptive of the observed fuel quality may comprise, for example, a heating value that is descriptive of the amount of heat released during combustion of a predefined amount of said fuel, such as the LHV.

It should be noted that the example of FIG. 1 is a conceptual one and omits a number of elements required in a real-life solution for providing fuel supply to the engine 106 and it may be varied or complemented in a number of ways without departing from the scope of the fuel quality monitoring technique described in the present disclosure. As an example in this regard, the fuel flow measurement assembly 108 may comprise a single fuel flow measurement entity, two or more fuel flow measurement entities arranged in a single physical entity or otherwise at the same location in the fuel supply line 102, two or more fuel flow measurement entities arranged in respective separate physical entities at the same location or at different locations of the fuel supply line 102, etc. As another example, the control entity 110 may be co-located with the other elements depicted in the example of FIG. 1 (e.g. provided as a part of the control system of the engine 104) or it may be remotely located. Moreover, the control entity 110 should be construed as a logical entity, that may be provided as one or more separate entities or components, some of which may be co-located with the other elements depicted in the example of FIG. 1 and some of which may be remotely located. However, the framework of FIG. 1 is sufficient for description of various characteristics of online fuel quality monitoring technique according to the present disclosure. Nevertheless, some examples of usage of the disclosed fuel quality monitoring technique via the fuel supply line 102 that may involve further entities are described later in this text in order to illustrate respective advantageous examples of implementing the fuel quality monitoring technique.

Herein, the reference to 'online' fuel quality monitoring involves instantaneous monitoring of the quality of the fuel that is actually supplied to the engine 106 in the course of its operation. Advantages arising from such online fuel quality monitoring, along the lines outlined above, include a possibility to estimate or compute parameters that are descriptive of the actual efficiency of the engine at improved accuracy and/or reliability, which results in obtaining information that is useful both in short-term and long term monitoring of the engine condition: for short-term monitoring an indication of the observed fuel quality may e.g. enable distinguishing between a change in engine efficiency resulting from a change in fuel quality and a change resulting from some other factor (e.g. malfunction in the engine), whereas for long-term monitoring the history of observed fuel quality indications may be applicable in evaluating whether the change in the engine efficiency over the same time period follows the observed fuel quality or whether there are (also) other factors contributing to the long-term trend in engine efficiency (e.g. continuous less-than-optimal usage of the engine, compromised or neglected maintenance of the engine, . . . ). Moreover, the 'online' fuel quality monitoring may also enable carrying out a(n immediate) corrective action and/or adjustment the engine 106 operation to account for observed fuel quality that does not meet predefined standards and further ensure that the observed quality measure(s) serve to indicate the quality of the fuel actually supplied to the engine 106 at a certain time.

The online fuel quality monitoring technique described in this disclosure may be especially beneficial for engines that are designed to combust liquid residual fuels such as the MFO or HFO referred to in the foregoing. However, the application of the disclosed fuel quality monitoring technique is not limited to residual fuels but is applicable to other liquid fuel types as well.

The fuel flow measurement assembly 108 is arranged to measure characteristics of the fuel flow in the fuel supply line 102 and provide, to the control entity 110, one or more measurement signals that are descriptive of the measured fuel flow characteristics in the fuel supply line 102. Preferably, the fuel flow measurement assembly 108 is arranged to measure characteristics of the fuel flow supplied from the fuel supply line 102 to the engine 106 in order to reflect the characteristics of the fuel as received by the engine 106 as closely as possible. In an example, the measured fuel flow characteristics directly indicate the fuel temperature and the fuel density. In another example, the measured characteristics include characteristics that enable deriving the fuel temperature and/or the fuel density (where the other one may be directly indicated). The fuel flow measurement assembly 108 may be also arranged to measure further characteristics of the fuel flow.

Herein, it should be noted that the fuel flow measurement assembly 108 basically measures the fuel flowing therethrough and information conveyed in the measurement signals obtained from the flow measurement assembly 108 do not take into account e.g. internal fuel leakages in the fuel supply line 102, in components arranged in the fuel supply line 102 and/or in the engine 108. However, such factors that may have an effect on the actual amount of fuel actually combusted in the engine are system and engine specific and the may be taken into account e.g. by adjusting the one or more fuel quality parameters (e.g. the heating value) derived in the control entity 110 accordingly or by otherwise considering the one or more fuel quality parameters derived in the control entity 110 in view of the such factors.

In an example, the fuel flow measurement assembly 108 comprises a single entity that is arranged to measure the fuel temperature and the fuel density (possibly with one or more further characteristics of the fuel). An example of such a measurement entity includes one or more mass flow meters arranged to measure the fuel temperature and the fuel density. Various flow meters suitable for the purpose are known in the art, while a specific example in this regard comprises a Coriolis type mass flow meter. In another example, the fuel flow measurement assembly 108 may comprise respective separate entities for measuring the fuel temperature and the fuel density. As an example in this regard, the fuel flow measurement assembly 108 may comprise one or more temperature sensors arranged to measure the fuel temperature and one or more flow meter assemblies arranged to measure the density of the fuel, where a respective temperature sensor may be arranged to measure the fuel temperature in or close to a respective mass flow meter assembly. Also in this arrangement each mass flow meter assembly may comprise a respective Coriolis type mass flow meter. In such an arrangement, the flow meter assembly may comprise a single entity that is arranged to directly provide a measurement of the fuel density or it may comprise two or more sub-entities that each are arranged to provide a respective measurement value that, in combination, enable deriving the fuel density (e.g. in the control entity 110). As an example of the latter approach, the two or more sub-entities may be arranged to measure, respectively, the mass of the fuel supplied to the engine 106 and the volume of the fuel supplied to the engine 106.

As described in the foregoing, the fuel flow measurement assembly 108 is communicatively coupled to the control entity 110. In this regard, the fuel flow measurement assembly 108 is arranged to provide one or more measurement signals to the control entity 110, which is arranged to derive the one or more parameters that are descriptive of the observed fuel quality based on information received in the measurement signals. The measurement signals comprise respective electrical signals that convey information that is descriptive of the current values of fuel characteristics measured in the fuel flow measurement assembly 108. The measurement signals may comprise respective analog or digital signals. As an example in this regard, respective analog signals that each exhibit a voltage or current that may be converted into respective characteristic of the fuel flow (e.g. the temperature or the density) by the control entity 110 may be employed. As another example, respective digital signals that each convey digital information that serves to indicate the respective characteristic of the fuel flow (e.g. the temperature or the density) may be employed. In a scenario where digital signal(s) are applied as the measurement signal(s), a single digital signal may convey information pertaining to a plurality of characteristics of the fuel flow (e.g. the temperature and the density).

As described in the foregoing, the control entity 108 is arranged to derive one or more parameters that are descriptive of the observed fuel quality based on the fuel flow characteristics indicated in the one or more measurement signals. In this regard, the control entity 108 may be arranged to carry out the steps of a method 200 illustrated by a flowchart in FIG. 2.

The method 200 commences by obtaining respective indications of the observed fuel temperature and the observed fuel density indicated in the one or more measurement signals, as indicated in block 202, and deriving a temperature-adjusted fuel density based on the indicated fuel density in dependence of a relationship between the observed fuel temperature and a predefined reference temperature, as indicated in block 204. The method 200 further comprises deriving, based on the temperature-adjusted fuel density, one or more parameters that are descriptive of the observed fuel quality, as indicated in block 206. The one or more parameters that are descriptive of the observed fuel quality may comprise, for example, a heating value that is descriptive of the amount of heat released during combustion of a predefined amount of said fuel in the engine 106. The method 200 may be complemented and/or varied in a number of ways, for example as described in the non-limiting examples provided in the following.

Figure 2:
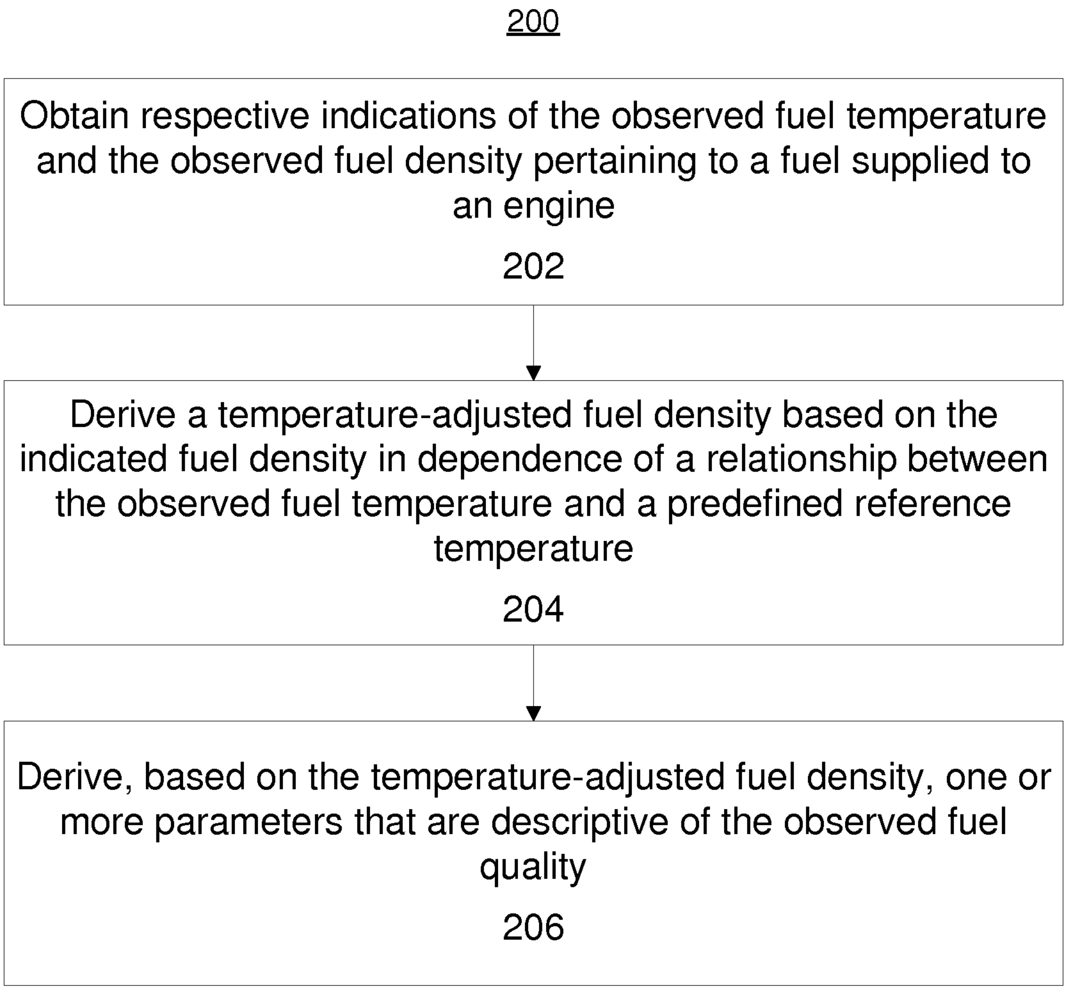
FIG. 2 illustrates a method according to an example.

Referring back to operations described for block 202 of FIG. 2, the observed fuel temperature and the observed fuel density may be obtained in the one or more measurement signals received from the fuel flow measurement assembly 108 described in the foregoing via a plurality of non-limiting examples. Along the lines described above, in an example, the control entity 108 may receive respective (direct) indications of the fuel temperature and the fuel density. In another example, the control entity 108 may receive e.g. a direct indication of the of the fuel temperature together with respective indications of one or more fuel flow characteristics that enable derivation of the fuel density in the control entity 108 (such as the mass of the fuel supplied to the engine 106 and the volume of the fuel supplied to the engine) and compute the fuel density based on these fuel flow characteristics (e.g. as the mass of the fuel divided by the volume of the fuel).

Referring back to operations described for block 204 of FIG. 2, derivation of the temperature-adjusted fuel density may comprise using a predefined conversion function to convert the observed fuel density at the observed fuel temperature into the temperature-adjusted fuel density at said predefined reference temperature. The conversion function may be provided, for example, as a mapping table stored in a memory that is accessible by the control entity 110, possibly accompanied by a mapping function. The lookup table may be also referred to as a lookup matrix, a mapping table or a mapping matrix. In the following, the term mapping table is predominantly applied. The conversion serves to enable mapping the observed fuel density at the observed fuel temperature to a corresponding temperature-adjusted fuel density within a predefined range from $\rho_{min}$ to $\rho_{max}$ at the predefined reference temperature. The conversion function may be designed for a distillate fuel or for a residual fuel of a predefined type, such as the HFO or the MFO. Non-limiting examples of the conversion function are provided in the following.

According to an example, the conversion function involves a mapping table together with a mapping function. The mapping table may comprise a list of table entries, each table entry including a pair of a candidate value for the temperature-adjusted fuel density $\rho_j$ and a corresponding candidate value for an adjustment factor $F_j$, which are applicable via the following mapping function to identify the temperature-adjusted density $\rho_{adj}$ at the reference temperature $T_{ref}$ corresponding to the observed fuel density $\rho_{obs}$ and the observed fuel temperature $T_{obs}$:

$$\rho_{adj}=\rho_{obs}/(1-F_{adj}*(T_{obs}-T_{ref})).$$

In particular, derivation of the temperature-adjusted fuel density via usage of the above mapping function and the above-described mapping table may comprise searching the mapping table in order to identify the mapping table entry j that includes the candidate value for the temperature-adjusted fuel density $\rho_j$ and the corresponding candidate value for an adjustment factor $F_j$ that, via usage of the mapping function, yield the temperature-adjusted fuel density $\rho_{adj}$ that is closest to the candidate value for the temperature-adjusted fuel density $\rho_j$ in the table entry j. Consequently, the candidate value for the temperature-adjusted fuel density $\rho_j$ in the identified mapping table entry may be applied as the temperature-adjusted fuel density $\rho_{adj}$.

The above example pertaining to the conversion function involving the mapping table and the mapping function assumed a nearest-neighbor search in the mapping table, where the candidate value of the temperature-adjusted fuel density $\rho_j$ in the identified mapping table entry is applied as such as the temperature-adjusted fuel density $\rho_{adj}$. In another example, assuming that the candidate value of the temperature-adjusted fuel density $\rho_j$ in the identified mapping table entry does not (fully) match the corresponding temperature-adjusted fuel density $\rho_{adj}$ obtained via usage of the mapping function, the final value for the temperature-adjusted fuel density $\rho_{adj}$. may be derived by applying a suitable interpolation technique to the two candidate values of the temperature-adjusted fuel density $\rho_j$ that are closest in value to that obtained via application of the mapping function in the above-described identification of the mapping table entry.

In the above examples pertaining to the conversion function comprising the mapping table together with the mapping function, in the table entries of the mapping table the value of the candidate value for the adjustment factor $F_j$ decreases with increasing candidate value of the temperature-adjusted fuel density $\rho_j$. Consequently, the temperature adjustment operates to adjust the observed fuel density $\rho_{obs}$ to a higher-valued temperature-adjusted fuel density $\rho_{adj}$, while the extent of applied temperature adjustment decreases with increasing fuel density and increases with increasing difference between the observed fuel temperature $T_{obs}$ and the reference temperature $T_{ref}$.

According to another example, the conversion function may be provided via a mapping table that comprises a two-dimensional table where each row represents a respective (observed) fuel density within a predefined range defined by respective minimum and maximum fuel densities and where each column represents a respective (observed) fuel temperature within a predefined range defined by respective minimum and maximum temperatures. In a variation of this approach, each column may represent a respective difference between an (observed) fuel temperature and the reference temperature. Hence, each cell of the two-dimensional table represents a respective combination of (observed) fuel density and (observed) fuel temperature (or difference to the reference temperature) and includes a respective fuel density at the reference temperature assigned for the respective combination of the observed fuel density and observed fuel temperature (or temperature difference).

Consequently, the temperature-adjusted fuel density may be found by identifying the row of the two-dimensional table representing the (observed) fuel density that is closest to the observed fuel density and identifying the column of the two-dimensional table representing the (observed) fuel temperature that is closest to the observed fuel temperature (or identifying the column of the two-dimensional table representing the temperature difference that is closest to the difference between the observed fuel temperature and the reference temperature), and applying the fuel density at the reference temperature found in the cell defined by the identified row and column as the temperature-adjusted fuel density.

In variation of the above example, the roles of the rows and columns of the two-dimensional table may be reversed such that each row represents a respective (observed) fuel temperature (or the observed temperature difference) and that each column represents a respective (observed) fuel density. In a further variation of the above example, the mapping table comprises a respective sub-table for each of a plurality of (observed) fuel temperatures (or for each of a plurality of differences between the observed fuel temperature and the reference temperature) within a predefined temperature range, where each sub-table includes a respective plurality of table entries that cover a respective plurality of (observed) fuel densities within a predefined density range, where each table entry maps a respective (observed) fuel density $\rho_j$ to a corresponding fuel density at the reference temperature $\rho_{adj}$. In a further variation of the above example, the roles of the sub-tables and their contents may be reversed such that each sub-table is provided for a respective (observed) fuel density within the predefined range, whereas the table entries of each sub-table cover a plurality of (observed) fuel temperatures (or differences between the observed fuel temperature and the reference temperature) within the predefined temperature range for the respective (observed) fuel density.

The reference temperature may be any desired temperature. As an example, the reference temperature may be 15 degrees Celsius, which is the temperature for derivation of the LHV for example according to the ISO 8217:2012

Annex E. The above non-limiting examples with respect to the conversion function implicitly assumes availability of a single reference temperature. In other examples, a respective conversion function may be provided for a plurality of different reference temperatures, where each of the conversion functions may be provided e.g. using one of the exemplifying approaches described in the foregoing. In such a scenario, derivation of the temperature-adjusted fuel density commences by selecting the conversion function of interest and applying the selected conversion function to find the temperature-adjusted fuel density in view of the observed fuel density and the observed fuel temperature.

The conversion function, e.g. the mapping table or the mapping table together with the associated mapping function that serves as the conversion function may be derived based on experimental data collected overtime. As an example, such experimental data may include a relatively large number of data points covering a plurality of different fuel densities within the predefined range from $\rho_{min}$ to $\rho_{max}$ at a plurality of fuel different temperatures within the predefined range from $T_{min}$ to $T_{max}$ together with the corresponding measured fuel density values in the reference temperature. As an example, the data points of such experimental data may be obtained from measurements carried out using one or more engines in the course of their normal use (e.g. in power plants or marine vessels), whereas the corresponding fuel density values in the reference temperature may be obtained via laboratory analysis of the fuel applied in collecting the respective data point(s). As another example, both the data points of the experimental data and the corresponding fuel density values in the reference temperature may be obtained in laboratory conditions.

Referring back to operations described for block 206 of FIG. 2, as described in the foregoing, derivation of the one or more parameters that are descriptive of the observed fuel quality may comprise deriving the heating value based on the temperature-adjusted fuel density. Deriving the heating value based on the temperature-adjusted fuel density instead of directly using the observed fuel density as basis for derivation is advantageous in that it results in more accurate and reliable derivation of the heating value: for example in case of residual fuels such as the MFO and the HFO the fuel density may decrease even significantly with the increasing temperature, while on the other hand fuels of such type typically need to be heated in order to adjust the fuel viscosity to a level that makes it suitable for supply to the engine 106. This is especially pronounced in case of the HFO, for which the temperature of the fuel when supplied to the engine 106 typically needs to be above 100 degrees to ensure suitable viscosity, whereas also in case of the MFO the temperature of the fuel supplied to the engine 106 may be in a range around 30 to 40 degrees Celsius. Since the operating temperature is dependent on the engine 106 and on the characteristics of the fuel supplied thereto, the observed fuel density is typically obtained in a temperature that is different from the reference temperature. This difference in fuel density increases with increasing difference between the reference temperature and the actual measurement temperature, while on the other hand the reliability and accuracy of the fuel quality analysis can be expected to improve when relying on a fuel density measurement that reflects characteristics of the fuel flow at the temperature at which it is supplied to the engine 106. Consequently, since the temperature of the fuel supplied to the engine 106 may be significantly higher than the reference temperature, in many occasions direct usage of the observed fuel density in estimation of the heating value yields an inaccurate or even grossly incorrect result.

A particular (but non-limiting) example of an applicable heating value is the lower heating value (LHV) referred to in the foregoing. A well-known approach for LHV estimation is the net specific energy defined under point E.2 of the ISO 8217:2012 Annex E, where the reference temperature is defined to be 15 degrees Celsius. In other examples, different approaches for estimating the LHV and/or different reference temperatures may be applied. On the other hand, as described in the foregoing, a typical temperature at which e.g. the residual fuel such as MFO or (especially) the HFO is supplied to the engine 106 may be significantly higher than the reference temperature, which renders direct of usage of the observed fuel density (at or near the temperature at which it is supplied to the engine 106) in computation of the LHV unfeasible. Instead, for example the LHV that comprises the net specific energy according the ISO 8217:2012 Annex E (or a derivative thereof) may be computed based on the temperature-adjusted fuel density for improved accuracy and reliability of the resulting LHV.

Whereas the main contributor to the heating value of the fuel is the observed (but temperature-adjusted) fuel density and hence a reasonable estimate of the heating value may be obtained directly based on the temperature-adjusted fuel density without accounting for other factors, further improvement in accuracy and reliability of the heating value estimation may be provided by taking into account a detrimental effect of predefined impurities that are typically present in the fuel. Examples of such impurities include water, ash and/or sulphur that may naturally occur in the fuel and/or (accidentally) mixed to the fuel. In most practical use cases the fuel supplied to the engine 106 is supplied from a so-called day tank, which includes fuel that has already gone through a cleaning process in order to remove (most of the) water and other impurities that are detrimental to the efficiency of the engine 106.

Consequently, the control entity 110 may obtain respective estimates of water content in the fuel, ash content in the fuel and the sulphur content in the fuel. These estimates may be obtained, for example, based on experimental data obtained via laboratory analysis of the fuel acquired from a certain fuel source. The respective estimates of the water content, ash content and sulphur content may be provided as respective average values derived based on the available experimental data. Even though such estimated values may not perfectly reflect the respective characteristics of the actual fuel flow in the fuel supply line 102, practical studies have shown that they nevertheless serve to improve the accuracy and reliability of the heating value estimation.

The LHV derivation that relies on the temperature-adjusted fuel density may be exactly the net specific energy defined in the ISO 8217:2012 Annex E or an adapted version thereof. In general, the LHV may be computed as a second-order function of the temperature-adjusted fuel density, value of which is further adjusted by a correction term that introduces the contribution of the impurities included in the fuel, derived as a function of the water content, the ash content and the sulphur content of the fuel. As an example in this regard, a generalized version of the equation provided in the ISO 8217:2012 Annex E may be applied to compute the LHV as the net specific energy $Q_{Rnp}$:

$$Q_{Rnp}=(C-A\rho_{adj}^2+B\rho_{adj})[1-\alpha(w_w+w_a+w_s)]+bw_s-cw_w,$$

where $\rho_{adj}$ denotes the temperature-adjusted fuel density at the reference temperature of 15 degrees Celsius (in kilograms per cubic meter), $w_w$ denotes the water content of the fuel (as a mass percentage), $w_a$ denotes the ash content of the fuel (as a mass percentage), and $w_s$ denotes the sulphur content of the fuel (as a mass percentage). According to the ISO 8217:2012 Annex E, the constants A, B, C, a, b and c may be set to the following values for computing the LHV for the HFO or for the MFO:

| Constant | Value per ISO 8217:2012 Annex E |
|---|---|
| A | $8.802 * 10^{-6}$ |
| B | $3.167 * 10^{-3}$ |
| C | 46.704 |
| a | 0.01 |
| b | 0.0942 |
| c | 0.02449 |

In other examples (pertaining to HFO or MFO or fuels of other type), adapted version of the above formula may be applied, wherein the adaptation may involve adjustment of one or more of the constant A, B, C, a, b and c. Alternatively or additionally, the adaptation of the formula may include omission of the correction term that accounts for the contribution of the impurities included in the fuel or deriving the correction term as a different function of one or more of the following: the water content, the ash content and the sulphur content of the fuel.

The control entity 110 may be arranged make direct use of the derived heating value and/or the heating value may be stored in the memory for subsequent use.

For the latter approach the memory may comprise the memory that is (directly) accessible by the control entity 110 or a memory in another device or entity. In the latter scenario, the act of storing the heating value in the memory further comprises transmitting the derived heating value to another device or entity via a communication network available for the control entity 110 for storage therein.

As an example, the direct application of the heating value in the control entity 110 may comprise deriving a fuel consumption indication, such as the specific fuel oil consumption (SFOC), based at least part on the derived heating value, e.g. the LHV. As an example, the SFOC may be derived as defined in the ISO-3046 standard, for example as described in the following.

$$BISO = \frac{\propto}{K} * \frac{LHV_{test}}{LHV_{ISO}} * Be - EDP,$$

where $$Be = \frac{1000 * (M - S * MLS/3600)}{P} * \frac{3600}{S},$$

$$K = \left(\frac{P_x}{P_{ra}}\right)^m * \left(\frac{T_{ra}}{T_x}\right)^n * \left(\frac{T_{cr}}{T_{cx}}\right)^S, \text{ and}$$

$$\propto = K - 0.7 * (1 - K) * \left(\frac{1}{\eta_{mek}} - 1\right),$$

where K denotes the ratio of indicate power, ∝ denotes the power adjustment factor, $P_x$ denotes barometric pressure during the measurement (in hPA), $P_{ra}$ denotes standard reference barometric pressure (in 1000 hPA), m denotes an exponent that may be set e.g. to value 0.7, $T_{ra}$ denotes reference air temperature (in K, e.g. $T_{ra}$=298 K), $T_x$ denotes the air temperature during the measurement (in K), n denotes an exponent that may be set e.g. to value 1.2, $T_{cr}$ denotes reference charge air coolant temperature (in K, e.g. $T_{cr}$=298 K), $T_{cx}$ denotes charge air coolant temperature during the measurement (in K), s denotes an exponent that may be set e.g. to value 1, $\eta_{mek}$ denotes mechanical efficiency of the engine 106, M denotes measured fuel quantity (in kg), S denotes time (in s), MLS denotes flow of clean leak fuel in in fuel pumps (in kg/h), P denotes engine power (in kW), $LHV_{test}$ denotes the derived LHV (in MJ/kg), $LHV_{ISO}$ denotes the LHV according to the ISO (in MJ/kg), EDP denotes fuel consumption of engine driven pumps (in g/kWh), Be denotes fuel oil consumption on a test bed (in g/kWh) without the corrections applied based on the actual energy content of the fuel and BISO denotes the engine efficiency corrected according to the ISO (in g/kWh).

Another example of usage of the derived heating value in the control entity 110 comprises estimation of the fuel quality and/or estimation of the efficiency of the engine 106 based at least in part on the derived heating value. The quality estimation may involve quality monitoring, e.g. such that the derived heating value is compared to a predefined threshold value and a warning message or a warning indication of other kind is issued in response to the derived heating values failing to exceed the threshold value. The warning indication may be provided, for example, as an audible and/or visual indication via the user interface coupled to the control entity 110.

A further example of usage of the derived heating value in the control entity 110 comprises adjusting operation of the engine 106 and/or adjusting characteristics of the fuel supply to the engine 106 based at least in part on the derived heating value. As a variation of such use, the control entity 110 may be arranged to display an indication of the derived heating value via the user interface coupled to the control entity 110 to enable a human operator responsible of the engine 106 to adjust operation of the engine 106 and/or to adjust characteristics of the fuel supply to the engine 106 based at least in part on the displayed heating value. A yet further variation of such use of the derived heating value involves using another measure derived from the heating value, such as the SFOC described above, as basis for adjusting the operation of the engine 106 and/or the fuel supply thereto.

In general, the control entity 110 may be arranged to continuously carry out the method 200. In this regard, continuously carrying out the method 200 may comprise, for example, carrying out the method 200 at predefined time intervals e.g. to enable monitoring changes in the heating value as such, changes in a value derived from the heating value (such as the SFOC), changes in observed fuel quality, etc. and/or to enable continuously adjusting the engine 106 operation or fuel supply thereto based at least in part on the derived heating value.

The framework schematically illustrated in the example of FIG. 1 may comprise a number of additional entities arranged in the fuel supply line 102 between the fuel tank 104 and the engine 106. As an example in this regard, there may be one or more entities that are arranged to adjust the viscosity of the fuel suitable for supply to the engine 106 e.g. by heating or cooling the fuel, to pump the fuel from the fuel tank 104 via the fuel supply line 102 to the engine 106, to manage (sufficient) fuel pressure in the fuel supply line 102 and/or manage circulation of the fuel.

While the example illustrated in FIG. 1 pertains to an example where the fuel supply line 102 serves to feed the engine 106 only, in other examples the fuel supply line 102 may be applied to feed an arrangement of two or more engines instead. In such scenarios the one or more parameters that are descriptive of the observed fuel quality (e.g. the heating values such as the LHV) derived in the control entity 110 based on the fuel flow characteristics indicated in the one or more measurement signals received from the fuel flow measurement assembly 108 serve to indicate characteristics of the fuel supplied to the two or more engines. In further examples, the fuel supply system serving two or more engines may operate such that an engine of the two or more engines is provided with an excess amount of fuel, e.g. approximately three to five times the amount that will be actually combusted therein, and the fuel not combusted by the engine is circulated back to a so-called de-aeriation tank (or mixing tank) where fuel circulated back from the engine is mixed with new fuel pumped from the fuel tank 102 before supplying it back to the engine. In such an arrangement, the fuel flow measurement assembly 108 is arranged to measure the fuel temperature and the fuel density of the fuel that is actually combusted in the engine. In an example, in order to enable observing the fuel flow characteristics to an individual engine in such an arrangement, the fuel flow measurement assembly 108 may comprise a first sub-assembly for measuring the fuel flow to an engine and a second sub-assembly for measuring the fuel flow circulated back from the engine. Consequently, the differences in fuel flow characteristics measured by the first sub-assembly and the second assembly enable deducing the actual amount of fuel combusted by the engine and hence enable e.g. deriving reliable estimate of the fuel consumption e.g. via estimation of the heating value(s) according to the method 200 described in the foregoing.

The method 200 described in the foregoing may be implemented by a hardware means, by a software means or by a combination of a hardware means and a software means. As an example in this regard, FIG. 4 schematically depicts some components of an apparatus 400 that may be employed to implement the control entity 110 and cause it to perform the method 200 described in the foregoing. The apparatus 400 comprises a processor 410 and a memory 420. The memory 420 may store data and computer program code 425. The apparatus 400 may further comprise communication means 430 for wired or wireless communication with other apparatuses and/or user I/O (input/output) components 440 that may be arranged, together with the processor 410 and a portion of the computer program code 425, to provide the user interface for receiving input from a user and/or providing output to the user. In particular, the user I/O components may include user input means, such as one or more keys or buttons, a keyboard, a touchscreen or a touchpad, etc. The user I/O components may include output means, such as a display or a touchscreen. The components of the apparatus 400 are communicatively coupled to each other via a bus 450 that enables transfer of data and control information between the components.

The memory 420 and a portion of the computer program code 425 stored therein may be further arranged, with the processor 410, to cause the apparatus 400 to perform the method 200 described in the foregoing. The processor 410 is configured to read from and write to the memory 420. Although the processor 410 is depicted as a respective single component, it may be implemented as respective one or more separate processing components. Similarly, although the memory 420 is depicted as a respective single component, it may be implemented as respective one or more separate components, some or all of which may be integrated/removable and/or may provide permanent/semi-permanent/dynamic/cached storage.

The computer program code 425 may comprise computer-executable instructions that implement functions that correspond to steps of the method 200 described in the foregoing when loaded into the processor 410. As an example, the computer program code 425 may include a computer program consisting of one or more sequences of one or more instructions. The processor 410 is able to load and execute the computer program by reading the one or more sequences of one or more instructions included therein from the memory 420. The one or more sequences of one or more instructions may be configured to, when executed by the processor 410, cause the apparatus 400 to perform the method 200 described in the foregoing. Hence, the apparatus 400 may comprise at least one processor 410 and at least one memory 420 including the computer program code 425 for one or more programs, the at least one memory 420 and the computer program code 425 configured to, with the at least one processor 410, cause the apparatus 400 to perform the method 200 described in the foregoing.

The computer program code 425 may be provided e.g. a computer program product comprising at least one computer-readable non-transitory medium having the computer program code 425 stored thereon, which computer program code 425, when executed by the processor 410 causes the apparatus 400 to perform the method 200 described in the foregoing. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Reference(s) to a processor herein should not be understood to encompass only programmable processors, but also dedicated circuits such as field-programmable gate arrays (FPGA), application specific circuits (ASIC), signal processors, etc. Features described in the preceding description may be used in combinations other than the combinations explicitly described.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:

1. An apparatus for analyzing fuel supplied to a combustion engine during operation of the engine, the apparatus comprising:

a fuel flow measurement assembly for measuring respective indications of a temperature of fuel supplied to an engine and a density of fuel supplied to said engine; and a control entity configured for deriving one or more parameters that are descriptive of observed fuel quality based at least on said temperature of the fuel and said density of the fuel, the control entity being configured to:

derive a temperature-adjusted fuel density based on the indicated density of fuel in dependence of relationship between the indicated temperature of the fuel and a predefined reference temperature that is applicable for deriving a lower heating value, LHV, that is descriptive of the amount of heat released during combustion of a predefined amount of said fuel; and derive the LHV as a net specific energy using a second-order function of the temperature-adjusted fuel density;

wherein the control entity is configured to carry out at least one of the following:
estimate a specific fuel consumption, SFOC value based at least in part on the LHV;
estimate quality of the fuel supplied to the engine based at least in part on the LHV;
adjust operation of the engine and/or adjust a fuel supply to the engine based at least in part on the LHV; and/or
display an indication of the derived LHV via a user interface coupled to the control entity to enable adjusting operation of the engine and/or adjusting the fuel supply to the engine based at least in part on the LHV.

2. An apparatus according to claim 1, wherein the control entity is configured to:
obtain respective estimates of water content, ash content and sulphur content of fuel supplied to the engine; and
derive the heating value based at least on the temperature-adjusted fuel density and said estimates of the water content, the ash content and the sulphur content of the fuel.

3. An apparatus according to claim 2, wherein said net specific energy is computed using the second-order function of the temperature-adjusted fuel density, adjusted by a correction term derived as a function of the water content, the ash content and the sulphur content of the fuel.

4. An apparatus according to claim 3, wherein the net specific energy is computed using the following formula:

$$Q_{Rnp}=(C-A\rho_{adj}^{2}+B\rho_{adj})[1-a(w_w+w_a+w_s)]+bw_s-cw_w,$$

where $\rho_{adj}$ denotes a temperature-adjusted fuel density at a reference temperature of 15 degrees Celsius (in kilograms per cubic meter), $w_w$ denotes a water content of the fuel (as a mass percentage), $w_a$ denotes an ash content of the fuel (as a mass percentage), $w_s$ denotes a sulphur content of the fuel (as a mass percentage), and where A, B, C, a, b and c denote respective predefined constant values.

5. An apparatus according to claim 4, wherein A, B, C, a, b and c are set to the following predefined values:
$A=8.802*10^{-6}$,
$B=3.167*10^{-3}$,
C=46.704,
a=0.01,
b=0.0942, and
c=0.02449.

6. An apparatus according to claim 1, wherein the control entity (110) is configured to derive the temperature-adjusted fuel density via usage of a predefined conversion function that converts an indicated density of fuel at the indicated temperature of fuel into the temperature-adjusted fuel density at said predefined reference temperature.

7. An apparatus according to claim 6, wherein said conversion function comprises:
a mapping table derived based on experimental data, the mapping table providing a mapping from a plurality of fuel densities within a first predefined range at a plurality of fuel temperatures within a second predefined range to a corresponding temperature-adjusted fuel density at said predefined reference temperature.

8. An apparatus according to claim 1, wherein said predefined reference temperature is 15 degrees Celsius.

9. An apparatus according to claim 1, configured for a fuel which is a residual fuel and/or a heavy fuel oil, HFO.

10. An apparatus according to claim 1, wherein said fuel flow measurement assembly comprises:
a Coriolis type mass flow meter.

11. A fuel quality monitoring arrangement comprising:
an apparatus according to claim 1, wherein said fuel flow measurement assembly is arranged in a fuel supply line between a fuel tank and an engine to measure a temperature of fuel supplied to said engine and a density of the fuel supplied to the engine.

12. An arrangement according to claim 11, wherein said fuel flow measurement assembly is arranged in a position of the fuel supply line where the fuel will be heated to a temperature at which it is supplied to the engine.

13. A method for analysis of fuel supplied to a combustion engine during operation of the engine, the method comprising:
obtaining respective indications of a temperature of the fuel supplied to said engine and a density of the fuel supplied to said engine;
deriving a temperature-adjusted fuel density based on the indicated density of fuel in dependence of relationship between the indicated temperature of the fuel and a predefined reference temperature that is applicable for deriving a lower heating value, LHV, that is descriptive of an amount of heat released during combustion of a predefined amount of said fuel; and
deriving the LHV as a net specific energy using a second-order function of the temperature-adjusted fuel density;
estimating a specific fuel oil consumption, SFOC value based at least in part on the LHV;
estimating quality of the fuel supplied to the engine based at least in part on the LHV;
adjusting operation of the engine and/or adjusting the fuel supply to the engine based at least in part on the LHV; and/or
displaying an indication of the derived LHV via a user interface coupled to the control entity to enable adjusting operation of the engine and/or adjusting the fuel supply to the engine based at least in part on the LHV.

14. A method according to claim 13, the method comprising:
obtaining respective estimates of water content, ash content and sulphur content of the fuel supplied to the engine; and
deriving the LHV based at least on the temperature-adjusted fuel density and said estimates of the water content, the ash content and the sulphur content of the fuel.

15. A method according to claim 14, comprising:
adjusting the net specific energy, computed using the second-order function of the temperature-adjusted fuel density, by a correction term derived as a function of the water content, the ash content and the sulphur content of the fuel.

16. A method according to claim 15, wherein the net specific energy is computed using the following formula:

$$Q_{Rnp}=(C-A\rho_{adj}^{2}+B\rho_{adj})[1-a(w_w+w_a+w_s)]+bw_s-cw_w,$$

where $\rho_{adj}$ denotes the temperature-adjusted fuel density at the reference temperature of 15 degrees Celsius (in kilograms per cubic meter), $w_w$ denotes the water content of the fuel (as a mass percentage), $w_a$ denotes the ash content of the fuel (as a mass percentage), $w_s$ denotes the sulphur content of the fuel (as a mass percentage), and where A, B, C, a, b and c denote respective predefined constant values.

17. A method according to claim 16, wherein A, B, C, a, b and c are set to the following predefined values:

$A=8.802*10^{-6}$, $B=3.167*10^{-3}$,

C=46.704, a=0.01, b=0.0942, and c=0.02449.

18. A method according to claim 13, wherein deriving the temperature-adjusted fuel density comprises:

using a predefined conversion function to convert the indicated density of fuel at the indicated temperature of fuel into the temperature-adjusted fuel density at said predefined reference temperature.

19. A method according to claim 18, wherein said conversion function comprises:

a mapping table derived based on experimental data, the mapping table providing a mapping from a plurality of fuel densities within a first predefined range at a plurality of fuel temperatures within a second predefined range to a corresponding temperature-adjusted fuel density at said predefined reference temperature.

20. A method according claim 13, wherein said predefined reference temperature is 15 degrees Celsius.

21. A method according to claim 13, wherein said fuel is a residual fuel and/or a heavy fuel oil, HFO.

22. A method according to claim 13, comprising:

using a fuel flow measurement assembly arranged in a fuel supply line between a fuel tank and the engine to measure the temperature of the fuel supplied to said engine and the density of the fuel supplied to the engine.

23. A method according to claim 22, wherein said fuel flow measurement assembly comprises:

a Coriolis type mass flow meter.

24. A method according to claim 22, wherein said fuel flow measurement assembly is arranged in a position of the fuel supply line where the fuel is heated to the temperature at which it is supplied to the engine.

25. A computer program comprising computer readable program code configured on a non-tangible storage medium for causing one or more computing apparatuses to perform steps of:

obtaining respective indications of a temperature of fuel supplied to said engine and a density of fuel supplied to said engine;

deriving a temperature-adjusted fuel density based on the indicated density of fuel in dependence of relationship between the indicated temperature of the fuel and a predefined reference temperature that is applicable for deriving a lower heating value, LHV, that is descriptive of an amount of heat released during combustion of a predefined amount of said fuel; and deriving the LHV as a net specific energy using a second-order function of the temperature-adjusted fuel density, the one or more computing apparatuses being arranged to receive respective indications of a temperature of the fuel supplied to said engine and a density of the fuel supplied to said engine;

estimating a specific fuel oil consumption, SFOC value based at least in part on the LHV;

estimating quality of the fuel supplied to the engine based at least in part on the LHV;

adjusting operation of the engine and/or adjusting the fuel supply to the engine based at least in part on the LHV; and/or displaying an indication of the derived LHV via a user interface coupled to the control entity to enable adjusting operation of the engine and/or adjusting the fuel supply to the engine based at least in part on the LHV.

* * * * *